UNITED STATES PATENT OFFICE.

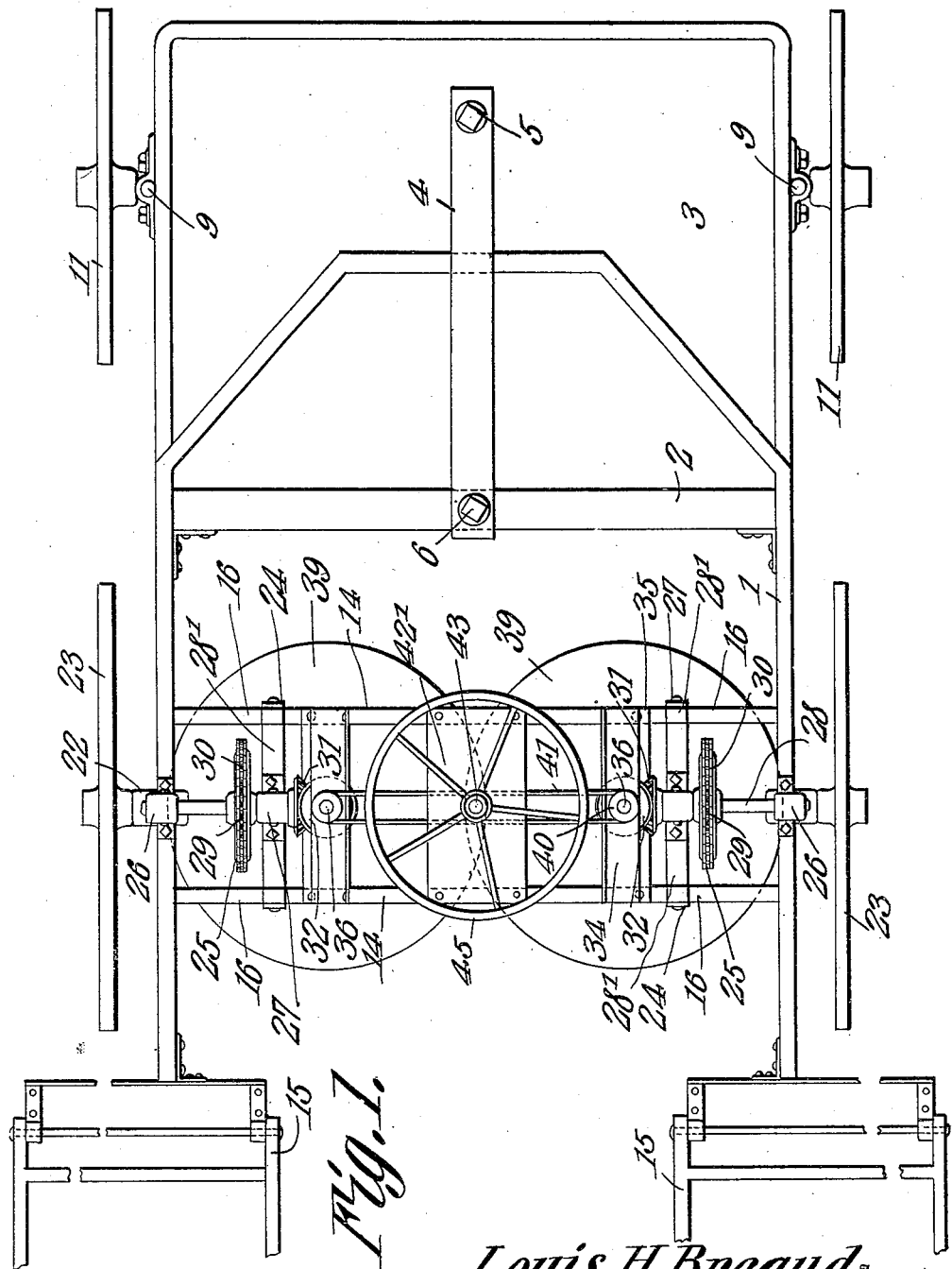

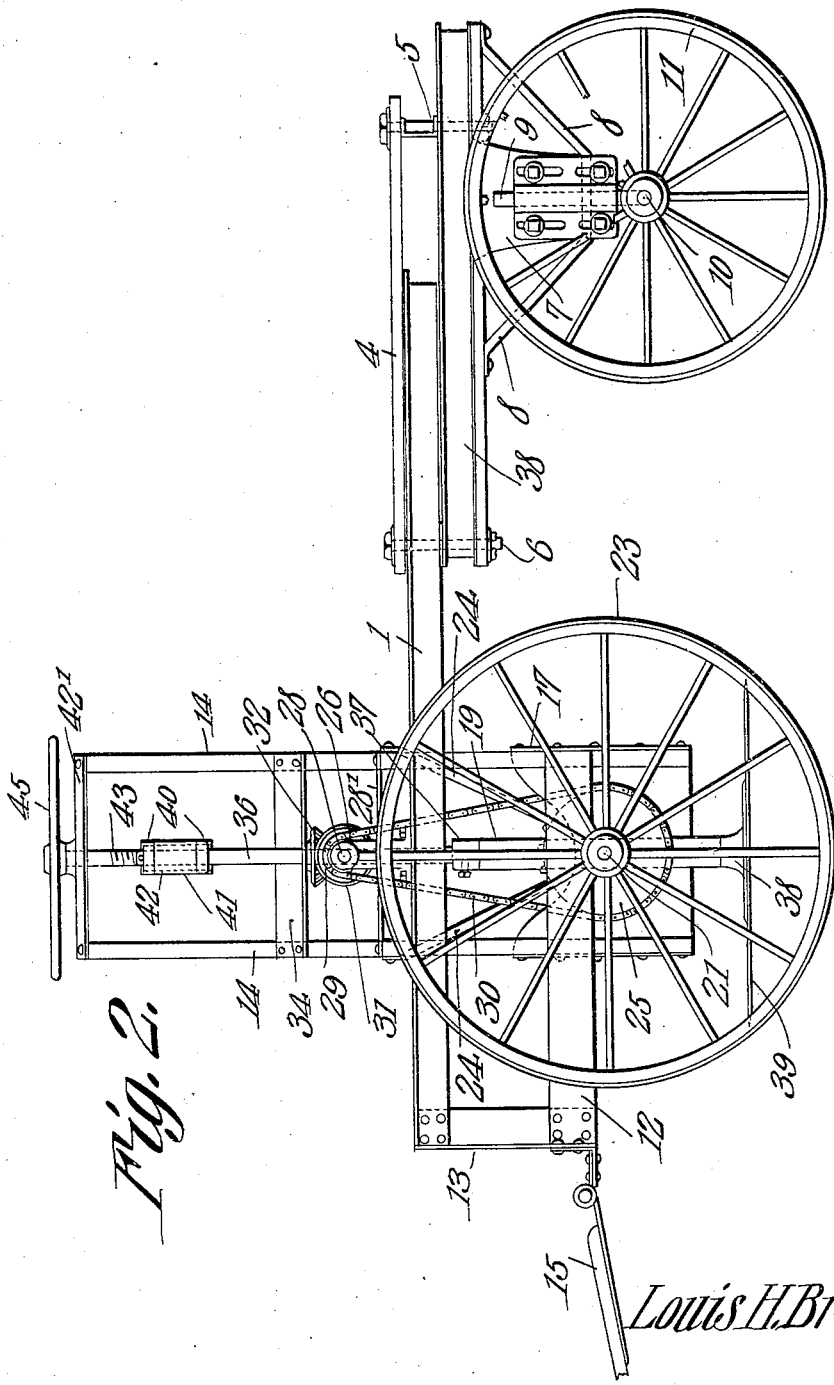

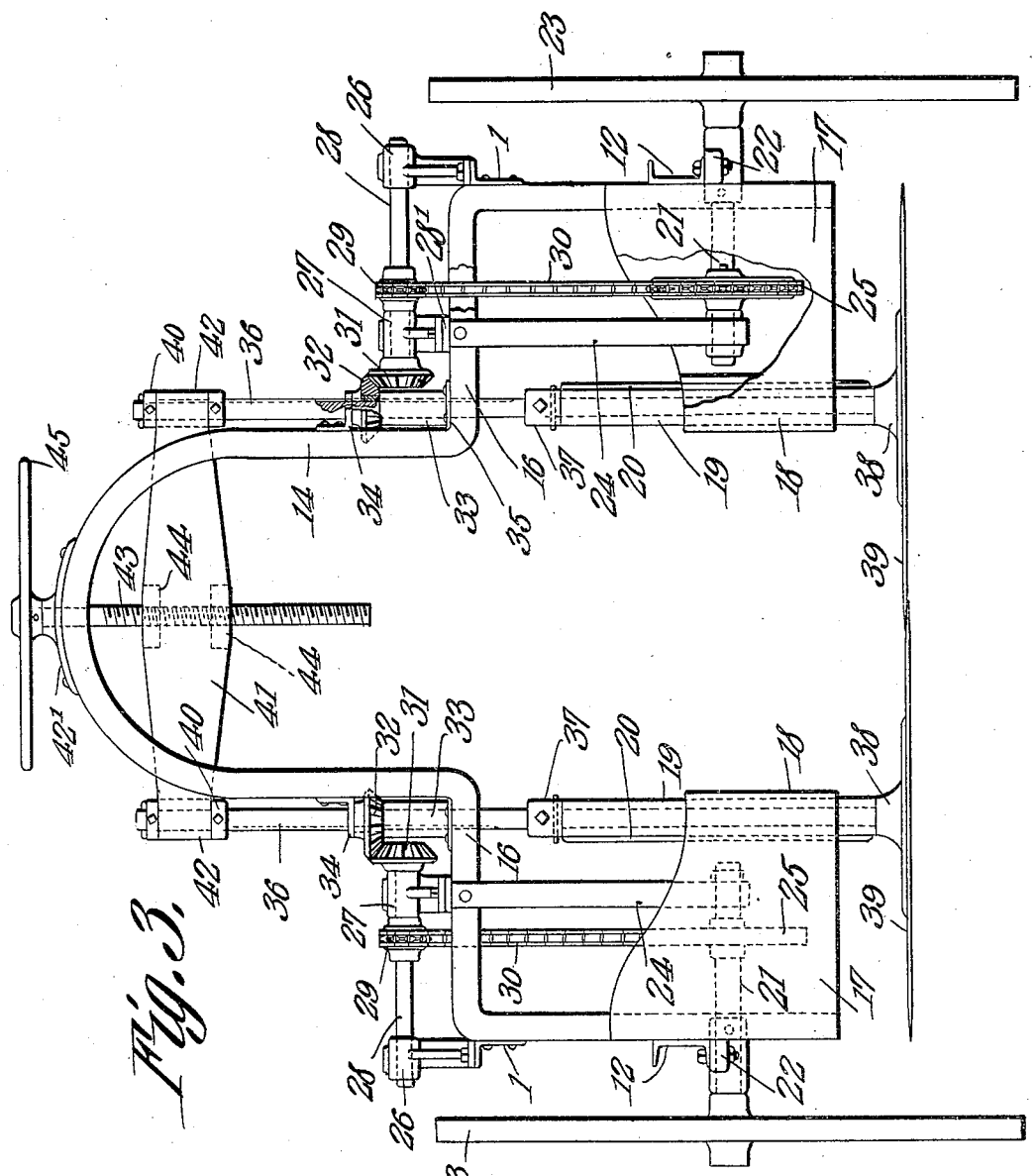

LOUIS H. BREAUD, OF THIBODAUX, LOUISIANA.

CANE-CUTTER.

936,404.  Specification of Letters Patent.  Patented Oct. 12, 1909.

Application filed February 23, 1909. Serial No. 479,414.

*To all whom it may concern:*

Be it known that I, LOUIS H. BREAUD, a citizen of the United States, residing at Thibodaux, in the parish of Lafourche and State of Louisiana, have invented a new and useful Cane-Cutter, of which the following is a specification.

This invention has relation to cane cutters, and it consists in the novel construction and arrangement of its parts, as hereinafter shown and described.

The object of the invention is to provide an implement of the character indicated which is adapted to cut the cane close to or in the ground, and leave the cane thus cut in windrows, with the severed ends on the soil and covered by the foliage of adjacent stalks, whereby the severed ends are protected against excessive bleeding, and the stalks are also protected against frost, and the sap against fermentation and souring.

By providing an implement which operates upon the cane in the manner indicated it is possible to cut the cane fast enough, and leave it covered sufficiently to prevent excessive loss by freezing following thawing; as it is possible to leave the cane in safety in the field in windrows as placed by the machine until the grinding mill is ready for its reception.

A further object of the invention is to provide an implement of the character indicated which will sever the cane stalks from the stubble by a moving contact of the edge of the disks against the standing cane, thus preventing splitting or uprooting of stalks, which would be the result if the disks were not rotated as indicated. The shafts which carry the disks extend to within close proximity of the ground, and have positive driving means, and the disks cut the stalks at a greater rate of speed than the rate of travel of the machine.

A further object of the invention is to provide, in an implement of the character indicated, a pair of rotating cutting disks, each of which is positively operated from a ground wheel, but the said disks are independently operated with relation to each other; that is to say, that in so far as their operation is concerned, each disk is positively connected with one of the ground wheels of the implement, but there is no positive connection between the disks, whereby the operation of one disk depends upon the operation of the other. By providing such an arrangement it will be seen that the implement may be readily turned, and also should it pass over uneven ground and one of the disk-operating wheels elevate above the ground, excessive strain will not be imposed thereby upon the mechanism and supports connected with the other disks to accomplish the cutting of the cane stalks.

A further object of the invention is to provide an implement of the character indicated which will shave stalks during the process of cultivation as low as may be desired without off-bearing, or without uprooting the stubble.

A further object of the invention is to provide, in an implement of the character indicated, a rigid forward frame mounted upon two short axles, to which the forward wheels are rigidly fastened, and a back truck, supported by two wheels of such diameter as to allow short turning of the machine on head land, these latter wheels running loose on short axles, with means for adjusting the said axles vertically to pitch the disks at a proper angle to the surface of the ground.

While the machine is especially adapted to be drawn by draft animals, it will operate with equal facility if drawn by an engine, or other motive power.

In the accompanying drawings:—Figure 1 is a top plan view of the cutter. Fig. 2 is a side elevation of the same, with parts broken away. Fig. 3 is a front elevation of the cutter, with parts removed and parts broken away.

The cane cutter consists of the U-shaped beam 1, which is horizontally disposed, with its end portions projecting forwardly. A cross-beam 2 is connected at its ends with the rear side portions of the beam 1. A platform 3 is located under the rear portion of the beam 1, and a bar 4 is mounted upon a pin 5, which in turn is supported upon the platform 3. The forward portion of the bar 4 projects over the rear portion of the beam 1, and the forward end of the said bar 4 is pivotally connected with the cross-beam 2 by means of a pivot bolt 6, which passes transversely through said bar 4, the cross-beam 2 and the forward portion of the platform 3. The standards 7 depend from the sides of the platform 3 and are held in proper position by means of the brace rods 8. The shanks 9 of the spindles 10 are pivotally connected with the outer sides of the standards 7. The rear supporting wheels 11 are journaled upon the spindles 10.

The relatively short beams 12 are located under the forward ends of the beam 1, and are held in parallel relation thereto by the depending standards 13 and the lower end portions of the parallel arch members 14. Thills or other suitable draft means (said thills being indicated at 15) are connected with the forward ends of the short beams 12. The upright portions of the arch members 14 are provided with the outwardly disposed shoulders 16, and to the lower ends of the said arch members 14 the plates 17 are attached, which plates are provided with sleeves 18, in which are slidably mounted the bearings 19. The bearings 19 are provided with the flanges 20 which retain the said bearings against rotation in the sleeves 18. The plates 17, sleeves 18 and bearings 19 are located under the outwardly disposed shoulders 16 of the arch members 14. Stub axles 21 are journaled for rotation in the bearings 22, which are mounted against the lower edges of the short beams 12. To the outer end of each of the axles 21 is fixed a traction wheel 23. The inner ends of the axles 21 are journaled for rotation in the lower ends of the struts or uprights 24, the upper end portions of which are attached to the outwardly disposed shoulders 16 of the arch members 14. Sprocket wheels 25 are fixed to the inner end portions of the stub axles 21 adjacent the uprights 24. Bearings 26 are mounted upon the upper sides of the end portions of the beam 1, and bearings 27 are mounted upon pieces 28′, which in turn are mounted at their ends upon the shoulders 16 of the arch members 14. Stub shafts 28 are journaled for rotation in the bearings 26 and 27. Each stub shaft 28 is provided with a sprocket wheel 29, and the sprocket chains 30 pass around the sprocket wheels 25 and 29. Beveled pinions 31 are fixed to the inner ends of the stub shafts 28 and mesh with beveled pinions 32, which are fixed to the sleeves 33. The sleeves 33 are retained against longitudinal movement by the flanged strips 34, which are secured at their ends to the upright portions of the arch members 14, and at their opposite ends by the strips 35, which are secured at their ends to the shoulders 16 of the said arch members 14. The sleeves 33 are splined upon the vertically disposed shafts 36, and the lower end portions of the said shafts 36 are journaled for rotation in the sleeves 19. The collars 37 are fixed to the shafts 36 and bear against the upper ends of the sleeves 19. Disk hubs 38 are fixed to the lower ends of the shafts 36 and bear against the lower ends of the sleeves 19. Steel disks 39 are concentrically mounted upon the disk hubs 38. The disk 39 upon one shaft 36 overlaps the inner edge portion of the disk 39 upon the opposite shaft 36. Collars 40 are adjustably mounted upon the upper end portions of the shafts 36. A cross-head 41 is provided at each end with a bearing 42, and each bearing 42 receives one of the shafts 36 and is held against longitudinal movement with relation to the said shaft by the said collars 40. The cross-head 41 lies between the upper end portions of the two arch members 14. A plate 42′ connects the upper ends of the two arch members 14 together and lies transversely with relation to the cross-head 41. A shaft 43 is journaled in the plate 42′ and is provided with a lower threaded end which is adapted to engage the threaded bearings 44 provided upon the cross-head 41. A hand wheel 45 is mounted upon the upper end of the screw-shaft 43.

From the above description it is obvious that by rotating the screw-shaft 43, the cross-head 41 is raised or lowered as desired, and consequently the shafts 36 will be moved longitudinally, together with the sleeves 19, in the bearings 18 of the plates 17. Thus the overlapping disks 39 may be raised or lowered, and means is thereby provided for causing the same to operate at any desired distance below the surface of the soil, or for lifting them entirely above the surface of the soil. Means being thus provided for adjusting the elevation at which the said disks 39 may operate, it will be seen that as the implement is drawn along the ground and the traction wheels 23 rotate, rotary movement is transmitted from the stub axles 21 through the sprocket wheels 25 and 29 and chains 30 to the stub shafts 28. From the said shafts rotary movement is transmitted through the beveled pinions 31 and 32 and splined sleeves 33 to the shafts 36, and thus the disks 39 are caused to rotate toward each other at their forward edge portions. Inasmuch as each disk 39 is connected up as above described with an independent or a separate traction wheel, each disk is rotated simultaneously with its connected traction wheel, but there is no operative connection between one disk and the other. By so arranging the disks the implement may make short turns, and one traction wheel may have escapement without affecting the other traction wheel or the parts operated thereby. As the implement is drawn along a row of standing plants the disks 39 are so adjusted that they will operate at a desired distance below the surface of the soil. Thus as the said disks rotate at their forward edge portions toward each other they will sever the stalks below the surface of the soil and the upper portions of the stalks will brush under the intermediate portions of the arch members 14, which will throw the upper portions of the stalks in a forward direction. At the same time that the stalks are bent forward, as indicated, or just prior thereto, the disks 39 will sever the stalks at the desired distance below the surface of the soil, and consequently when the said stalks fall in a forward direction their butt ends remain on the soil and are covered by the foliage of the stalks previously cut. Thus the stalks remain in the rows with their butt ends covered by soil and foliage, and are thereby protected in the manner as above indicated. By reason of the facts that the disks 39 operate upon the stalks below the surface of the soil, sufficient rigidity is added to the stalks to enable the disks 39 to cut the same with a substantially transverse cut, thereby preventing splitting of the stalks and loss of sap incident thereto.

Having described my invention, what I claim as new, and desire to secure, by Letters Patent, is:—

1. A cane cutter comprising a frame, spaced arch members carried by the frame, said arch members having at intermediate points laterally disposed shoulders, wheels supporting the frame, bearings carried by the frame and located under the shoulders of the arch members, journaled shafts slidably mounted in said bearings, means mounted upon the arch members and operatively connected with the shafts for adjusting the same and holding them in adjusted position, overlapping disks mounted upon the shafts and means for rotating the said shafts.

2. A cane cutter comprising a frame, arch members carried by the frame, wheels supporting the frame, vertically adjustable shafts journaled for rotation upon the arch members, a cross-head connecting the shafts together, means mounted upon the arch members for adjusting said cross-head vertically, overlapping disks carried by the shafts and means for rotating the shafts.

3. A cane cutter comprising a frame, spaced arch members carried by the frame and having laterally disposed shoulders, wheels supporting the frame, stub axles journaled in the frame and carried by the wheels, stub shafts journaled upon the arch members above the laterally disposed shoulders thereof, means operatively connecting the stub axles and stub shafts together, vertically disposed shafts journaled in bearings located below the shoulders of the arch members, means operatively connecting the last said shafts with the stub shafts, overlapping disks carried by the vertically disposed shafts, and means mounted upon the arch members for adjusting the vertical shafts and holding the same in adjusted position.

4. A cane cutter comprisng a frame made up of a U-shaped beam having its ends forwardly disposed, a platform pivotally connected with the rear portion of the said frame, wheels supporting said platform, traction wheels supporting the forward portions of the beam, spaced arch members mounted between the end portions of the beam, vertically adjustable shafts carried by the arch members, means mounted upon the arch members for adjusting the said shafts vertically, overlapping disks carried by the said shafts, and means operatively connecting the said shafts with the supporting wheels of the frame.

5. A cane cutter comprising a frame, spaced arch members having laterally disposed shoulders carried by the frame, plates fixed to the lower portions of the said arch members and having sleeves located under the laterally disposed portions of the arch members, bearings slidably mounted in said sleeves, vertically disposed shafts journaled for rotation in said bearings, means mounted upon the arch members and connected with the said shafts for adjusting the same, together with the bearings vertically, overlapping disks carried by the shafts, and means operatively connecting the said shafts with the supporting wheels.

In testimony that I claim the foregoing as my own, I have hereto affixed my signature in the presence of two witnesses.

LOUIS H. BREAUD.

Witnesses:
  THOMAS A. BADEAUX,
  G. J. KOBLODS.